United States Patent [19]

Ziegelmeyer

[11] 4,418,502
[45] Dec. 6, 1983

[54] ELEVATABLE GRINDING WHEEL MOTOR SUPPORT

[76] Inventor: Lynn J. Ziegelmeyer, P.O. Box 1112, Medford, Oreg. 97501

[21] Appl. No.: 281,211

[22] Filed: Jul. 6, 1981

[51] Int. Cl.$^3$ ............................................. B24B 41/04
[52] U.S. Cl. ........................... 51/166 MH; 51/165.81
[58] Field of Search ............ 51/229, 92 R, 168, 165.8, 51/165.81, 165.82, 166 MH; 76/25 A

[56] References Cited

U.S. PATENT DOCUMENTS

| 140,173 | 6/1873 | Thomas et al. | |
| 850,922 | 4/1907 | Goforth | 51/168 |
| 1,475,614 | 11/1923 | Williams | 51/166 MH |
| 1,945,396 | 1/1934 | Gerling | 51/92 R |
| 2,055,555 | 9/1936 | Peters | 51/166 MH |
| 2,383,619 | 8/1945 | Rosner | 51/229 |
| 2,792,724 | 2/1956 | Durall | |
| 3,098,327 | 7/1963 | Malin | 51/229 |
| 3,139,774 | 7/1963 | Sipinen et al. | |
| 3,239,169 | 12/1963 | Sloyan | |
| 3,457,809 | 6/1967 | Bowerman | |
| 4,104,793 | 8/1978 | Simington | |

Primary Examiner—Harold D. Whitehead
Attorney, Agent, or Firm—Kolisch, Hartwell & Dickinson

[57] ABSTRACT

A support mounting a grinding wheel motor for adjustable movement with respect to a grinding station in a saw chain depth-grinding apparatus. The support includes a threaded element to which the motor is secured, and a sleeve mounted at a fixed position with respect to the grinding station. The sleeve has an internal bore in which the threaded element is axially movable, with the sleeve and element being keyed to prevent relative rotation therebetween. A pair of nuts screwed on the element engage opposite ends of the sleeve to secure the element at an adjusted axial position on the sleeve.

2 Claims, 3 Drawing Figures

ELEVATABLE GRINDING WHEEL MOTOR SUPPORT

BACKGROUND AND SUMMARY

The present invention relates to a motor support and in particular, to a support mounting a grinding wheel for adjustable movement with respect to a grinding station in a saw chain depth-grinding apparatus and the like.

In my U.S. Pat. No. 4,267,751 I disclose a saw chain depth-grinding apparatus for grinding the depth stops in a conventional saw chain formed of plural cutter links, where each link includes a depth stop and a cutter blade extending above the associated depth stop. The apparatus includes a motor-driven grinding wheel mounted on a frame, and a swing arm pivotally mounted on the frame for swinging in a limited-movement arcuate path beneath the grinding wheel, and for shifting radially away from such path against the urging of a spring interposed between the arm and the frame. A guide member mounted on the frame adjacent the grinding wheel is positioned to contact a cutter blade in a cutter link supported on the swing arm, as the arm is moved arcuately below the grinding wheel. Contact between the cutter blade and the guide member causes the pivot arm to shift radially downwardly, against the urging of the above-mentioned spring, as the cutter link passes directly below the grinding wheel, to limit the closest approach between the depth stop on the cutter link and the grinding wheel. The grinding wheel motor in the apparatus is mounted on the frame on a scissor-type lift which is height adjustable to vary the relative height position of the grinding wheel with respect to the guide member on the frame. This adjustment is used to set the depth of grinding of the depth stops.

One limitation associated with the motor height adjustment feature in the above apparatus is the difficulty in adjusting the scissor lift to produce accurate, small changes in the position of the grinding wheel. For example, an operator, after initially adjusting the apparatus to produce one grinding depth, may wish to readjust the grinding wheel position as little as a few mils to vary grinding depth correspondingly. This adjustment requires a certain amount of trial and error on the part of the operator, first in adjusting the scissor lift, then in independently checking the resultant vertical spacing between the grinding wheel and the guide member. Another problem is that once the scissor lift has been height adjusted, the grinding wheel position may shift as the lift's moving parts settle slightly during the course of a chain grinding operation.

It is, therefore, one object of the present invention to provide in a grinding apparatus having a grinding station defined by a guide member, a support mounting a grinding wheel motor for accurate and stable adjustable movement with respect to the grinding station.

A more specific object of the invention is to provide such a support which can be adjusted to vary the grinding wheel motor position accurately within a range of a few thousandths of an inch.

Another object of the present invention is to provide such a support which is simple in construction and operation.

The present invention includes a grinding wheel motor support which is adjustable with respect to a grinding station in a saw chain depth-grinding apparatus and the like. The support includes a threaded element to which the grinding wheel motor is attached, and a sleeve mounted on a frame in the apparatus at a fixed position with respect to the grinding station. The sleeve has a bore in which the threaded element is movable, to adjust the position of the grinding wheel with respect to the grinding station, the sleeve and threaded element being keyed to prevent relative rotation therebetween. A pair of nuts screwed on the element bear against opposite ends of the sleeve to secure the threaded element at a desired axial position with respect to the sleeve.

In a preferred embodiment, the sleeve has annular beveled end recesses, and the nuts have annular beveled shoulders contactable with associated sleeve recesses to produce centering of the threaded element in the bore.

These and other objects and features of the present invention will become more fully apparent when the following detailed description of a preferred embodiment of the invention is read in conjunction with the accompanying drawings.

DETAILED DESCRIPTION OF THE PREFERRED EMBODIMENT OF THE INVENTION

Figure 1:
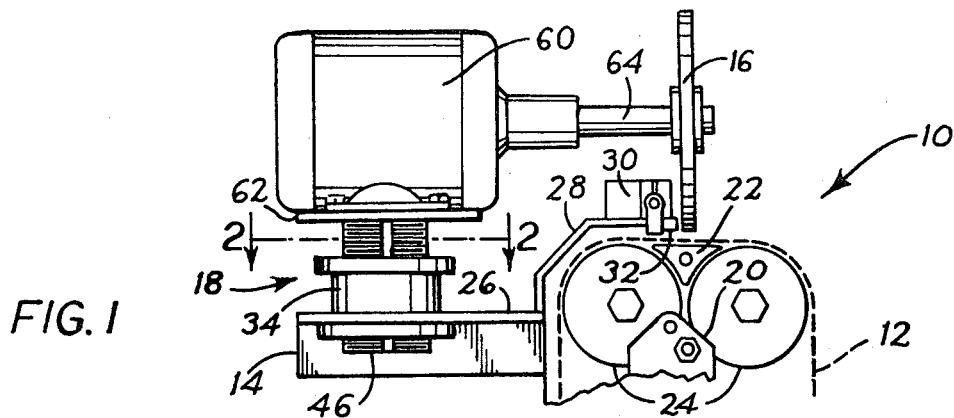
FIG. 1 is a side view of the upper portion of a saw chain depth-grinding apparatus employing the wheel motor support of the present invention.

FIG. 1 shows an upper fragmentary portion of a sawchain grinding apparatus 10 operable to grind the depth stops in an endless saw chain, such as the one shown by dashed lines at 12 in the figure. While not detailed in the figure, chain 12 conventionally is composed of plural cutter links where each link has a cutter blade and a depth stop which leads the cutter blade in a chain saw cutting operation.

Describing those components of apparatus 10 necessary for an understanding of the present invention, a frame 14 in the apparatus is adapted to be mounted on a table or the like by clamping structure (not shown) on the lower end of the frame. A motor-driven grinding wheel 16 is mounted on the frame for vertical adjustment with respect thereto by a support 18 constructed according to the present invention. Details of the support will be described below with particular reference to FIGS. 2 and 3.

A swing arm 20 in the apparatus has a platform 22 carried on the arm's upper end in FIG. 1 for supporting a chain, such as chain 12, during a grinding operation. A pair of chainguide wheels 24 rotatably mounted on the upper end of arm 20, on either side of platform 22, function to guide a chain, such as chain 12, in a linear path across the upper surface of the platform. The arm also supports a chain-advance device (not shown) which is operable to advance the chain in a counterclockwise direction in FIG. 1, in successive increments to place successive cutter links on the platform for grinding. The swing arm is mounted adjacent its lower end (not shown) on frame 14 for swinging in a limited-travel arcuate path which carries platform 22 toward and away from the reader in FIG. 1, positioning platform 22 substantially directly below wheel at the center of the arcuate path. The mounting of the swing arm on the frame also accommodates limited radial movement of the arm with respect to the frame, permitting platform 22 to shift radially away from wheel 16, against the biasing of a spring in the swing arm mounting, as arm 20 approaches the wheel along its arcuate path.

An upper plate 26 in frame 14 supports a bracket 28 extending upwardly and to the right of the plate in FIG. 1. A chain stop device 30 mounted on bracket 28 cooperates with the above-mentioned chain-advance device on arm 20 to position each cutter link in a chain at a well-defined grinding position on platform 22.

A guide member 32 carried on the lower right end portion of the bracket in FIG. 1 is positioned to engage the upper surface of a cutter blade in a platform positioned cutter link as arm 20 is swung along its arcuate travel path. According to an important feature of the apparatus, as detailed in my above-mentioned U.S. Pat. No. 4,267,751, contact between the cutter blade and guide member acts to shift arm 20 radially downwardly, against the biasing of the above-mentioned spring in the arm mounting, to place the associated depth stop in the cutter link at a desired vertical position with respect to wheel 16 as arm 20 is swung through its arcuate path. Wheel 16 then grinds the depth stop to an adjusted depth with respect to the associated cutter blade in that link. The region in the apparatus immediately to the right of member 32 in FIG. 1, where depth guage grinding occurs, is referred to herein as a grinding station.

Figure 3:
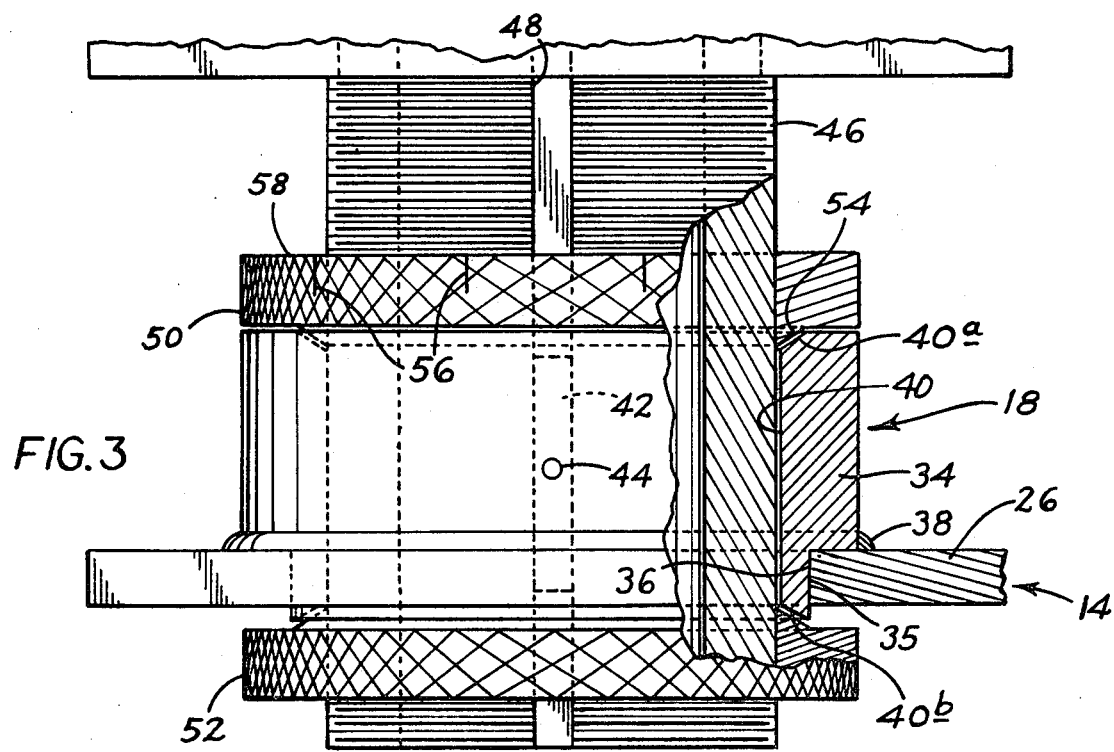
FIG. 3 is an enlarged, partially cutaway side view of the invention as viewed in FIG. 1.

Looking now at details of support 18, a mounting, or sleeve, 34 in the support has a lower annular step 35 which is received in a suitable opening 36 formed in plate 26, as seen in the cutaway portion of FIG. 3. The sleeve is secured to plate 26 by spot welds, such as the one shown at 38. A central cylindrical bore formed in the sleeve terminates at upper and lower beveled end recesses 40a, 40b, respectively.

Figure 2:
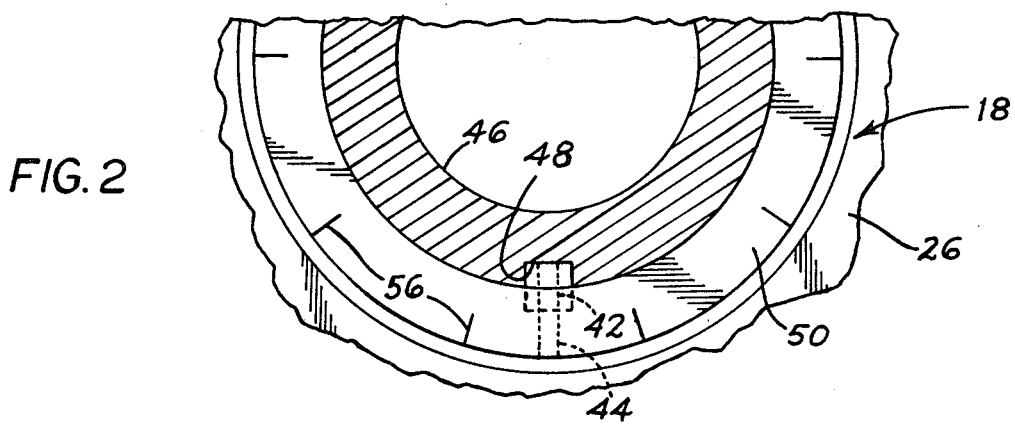
FIG. 2 is an enlarged fragmentary sectional view taken generally along line 2—2 in FIG. 1.

A key 42 positioned within an axially extending groove formed in sleeve 34 has a radially inwardly projecting portion extending into the sleeve bore as seen in FIG. 2. Key 42 is held in place on the sleeve by a roll pin 44.

An elongate threaded element 46 in the mounting has an outer diameter somewhat less than the inner diameter of the sleeve bore, permitting axial shifting of the element in the sleeve bore. An axially extending keyway 48 formed in the outer surface of element 46 slidably receives the inwardly projecting portion of key 42 permitting axial movement of the threaded element with respect to the sleeve, but preventing relative angular movement therebetween. The invention contemplates that the threads on element 46 are of a relatively fine pitch, one preferred pitch on the threads being about 20 threads to an inch.

A pair of knurled nuts 50, 52 screwed on element 46 bear against opposite ends of sleeve 34 to secure the element axially in the bore. Each nut includes an annular, inwardly facing beveled shoulder, such as shoulder 54 on nut 50, which is constructed to contact the associated beveled sleeve recess such as recess 40a in sleeve 34, when the nut is screwed against the sleeve end, to produce centering of the threaded element in the bore. The two shoulders and recesses in the sleeve and nuts are also referred to herebelow collectively as centering means.

Plural angularly spaced markings, such as markings 56, formed on the upper surface of nut 50 indicate the rotational position of the nut with respect to a fixed indicator position on element 46, e.g. the center line of keyway 48. Where, as here, ten equally spaced markings are provided, and where element 46 has a thread pitch of 20 threads per inch, rotating nut 50 between adjacent markings changes its vertical position on the element by five mils.

Referring to FIG. 1, a grinding wheel motor 60 is mounted, as by bolting, to a motor-mounting plate 62 secured, as by welding, to the upper end of element 46. Wheel 16 is mounted on the motor's output shaft 64 for powered rotation about the shaft axis.

In a depth-grinding operation, a saw chain, such as chain 12, is placed on the swing arm in apparatus 10 as indicated in FIG. 1. To adjust the apparatus to produce a desired depth of depth stop grinding, a cutter link in the chain is selected arbitrarily and the depth of the depth stop in that cutter link below the associated cutter blade is measured in a well-known manner using a dial indicator tool or the like. For purposes of illustration, asssume that the measured spacing between the depth stop and associated cutter blade is 25 mils, and that it is desired to grind the depth stop to produce a depth stop spacing, below the cutter blade, of 40 mils. The chain is advanced on the swing arm to position the selected cutter link at a grinding position on platform 22, and arm 20 is pivoted to place the associated depth stop at the grinding station directly below wheel 16. The wheel is then lowered from an elevated position above the depth stop to a position just contacting the upper surface of the depth stop by rotating nut 50 in a direction which lowers the position of element 46 in the sleeve.

To set the apparatus for grinding the chain depth stops to 40 mils, arm 20 is pivoted away from the grinding wheel to allow the latter to be lowered an additional 15 mils This is done by rotating nut 50 through three markings on the nut to raise the nut 15 mils on the element, lowering wheel 16 the same distance. Lower nut 52 is then tightened manually to center and lock the element in the bore.

After grinding a depth stop, and measuring the grinding depth the operator may wish to reset the position of the grinding wheel to increase or decrease the grinding depth by a few mils. By way of illustration, to raise the wheel height two and a half mils, nut 52 is first released and nut 50 then rotated half the distance between adjacent markings to raise element 46 the desired distance with respect to sleeve 34. The lower nut is then tightened against the lower end of the sleeve as before.

It can be appreciated from the foregoing that the motor mounting of the invention is operable to produce a precise and finely controllable height adjustment in a grinding wheel supported on the mounting. Contact between the beveled shoulders in the clamping nuts in the mounting and the beveled sleeve end recesses acts to secure the support at a stable, centered position once adjusted. The relatively large-diameter knurled nuts allow the mounting to be adjusted manually without the use of tools.

While a preferred embodiment of the invention has been described herein, it will be apparent to those skilled in the art that various changes and modifications may be made without departing from the spirit on the invention.

It is claimed and desired to secure by Letters Patent:

1. In grinding apparatus including a grinding station and a grinding wheel motor disposed to one side of said station, means supporting said motor for adjustable movement with respect to the station comprising a threaded element fixed to the motor, a frame, a mounting for the threaded element carried by said frame at a fixed position with respect to said station, said mounting having an internal bore extending therethrough which receives said element with clearance provided between outer extremities of the threads in the element and the inner surface of the bore, a pair of nuts screwed onto said element bearing on opposite sides of said mounting, and means interposed between said mounting and said element preventing relative rotational movement therebetween, said nuts and opposite sides of said mounting having means producing centering of said threaded element in said bore with tightening of said nuts against opposite sides of said mounting, said means producing centering comprising annular beveled recesses on opposite sides of the mounting encircling the bore and annular shoulders on said nuts contactable with said recesses to produce centering of said threaded element in said bore.

2. In grinding apparatus including a grinding station and a grinding wheel motor disposed to one side of said station, means supporting said motor for adjustable movement with respect to the station, comprising a threaded element fixed to the motor and extending downwardly therefrom, said threaded element having a channel extending axially along a side thereof, a frame, a sleeve carried by said frame with the axis thereof substantially vertical, said sleeve having a bore extending therethrough between its ends, said threaded element extending through said bore with clearance provided between outer extremities of the threaded element and the inner surface of the bore, a key mounted on said sleeve projecting radially into said bore and extending in said channel preventing relative rotation of said sleeve within said bore, and a pair of nuts screwed onto said elements bearing against opposite ends of the sleeve, said nuts having beveled annular shoulders on sides facing opposite ends of the sleeve and said sleeve having annular beveled recesses surrounding said bore at opposite ends thereof which receive such shoulders to produce centering of said threaded element in said bore.

* * * * *